United States Patent [19]
Krietzman et al.

[11] Patent Number: 5,829,391
[45] Date of Patent: Nov. 3, 1998

[54] UNDER-THE-DOOR MOUNTED PET TOY

[76] Inventors: Mark Howard Krietzman; Yu-Hsin Chen, both of 2347 W. 246th Pl., Lomita, Calif. 90717

[21] Appl. No.: 827,993

[22] Filed: May 15, 1997

Related U.S. Application Data

[60] Provisional application No. 60/024,216, Aug. 15, 1996.

[51] Int. Cl.⁶ .................................................. A01K 29/00
[52] U.S. Cl. ............................................................ 119/708
[58] Field of Search ................................... 119/707, 708; 446/486; 16/49

[56] References Cited

U.S. PATENT DOCUMENTS 2,577,309  12/1951  Carwile .................................... 446/486
5,505,161   4/1996  Swendseid .............................. 119/708

*Primary Examiner*—Robert P. Swiatek

[57] ABSTRACT

A removable anchor for suspending a pet toy and exercise device under the bottom of an existing dwelling door to allow the pet to interact with the pet toy and exercise and play by itself, the device comprises a durable removable door anchor, supporting a variety of interchangeable wands, teases, scratching surface and track-ball enclosures all of which encourage a pet to interact "on its own" with the device.

15 Claims, 3 Drawing Sheets

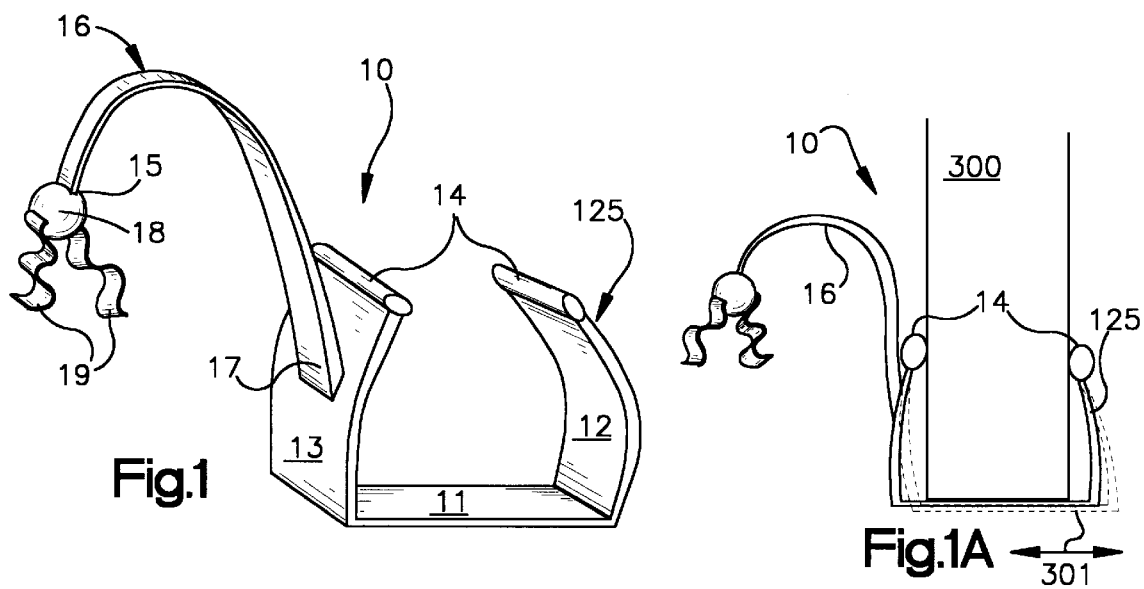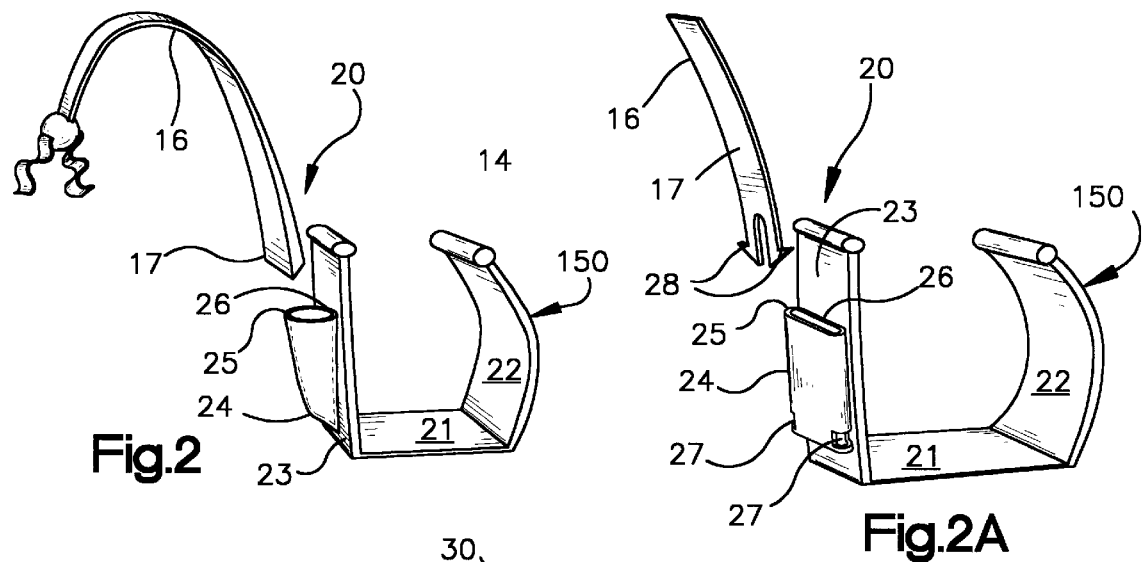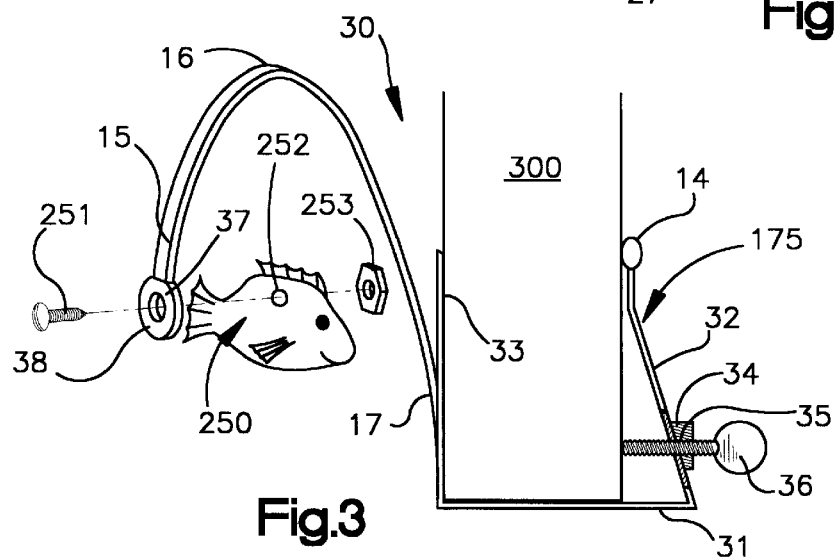

UNDER-THE-DOOR MOUNTED PET TOY

RELATED APPLICATIONS

The within invention claims the benefit, under Title 35, United States Code §119 (e), of Provisional Application 60/024,216, filed Aug. 15, 1996.

TECHNICAL FIELD OF THE INVENTION

This invention relates to the art of removable under-the-door anchoring systems, and more particularly, to a novel group of pet toys & exercise devices anchored to the bottom edge of an existing dwelling door. Anchored toys & exercise devices include target objects, rolling targets within pre-defined tracks, scratching surfaces, and flexible wands with target objects. An anchored toy and exerciser of this type engages a small animal such as a dog or cat to "play on its own," and provides valuable exercise for the animal which can alleviate boredom and destructive behavior.

BACKGROUND

The history of suspended small animal toys has generally involved solutions which require a human hand to hold the toy and "tease" the animal, or provide for mounts to suspend the toy with inadequate mount strengths to withstand the constant battering of the target by the animal. Other solutions achieve strong supports but may present functional problems by blocking a door or doorway. Track-ball enclosures which confine a rolling target are plentiful in the art but are also easily moved about by the animal during play. Mounted scratching surfaces are also well known in the art.

A suspended pet toy such as that taught by U.S. Pat. No. 4,712,510, issued to Tae Ho, discloses a telescoping flexible wand which mounts via suction cups. Suction cups require a smooth surface for adequate adhesion. Additionally, even on a smooth surface suction cups may become strained when the cat batters the target object and often disengages from that surface.

U.S. Pat. No. DES 295,798 issued to Boelke describes a hand held wand.

U.S. Pat. No. 4,438,727, issued to Thompson, teaches a suspended cat toy which is mounted in a doorway. This configuration eliminates the problem found in suction cups. However, this invention requires the door to be ajar and obstructs passage through the doorway.

U.S. Pat. No. 5,322,036 issued to Merino, teaches a target object attached to a spring and affixed to a free standing base. This configuration may be knocked over which eliminates the reactive attraction.

Applicants' U.S. Pat. No. 5,474,032 for an over the door mounting system to suspend a wand and target object over the top of an existing dwelling door is a gravity based "passive mount" which rests on top edge of the door. If such a passive mount is applied upside down resting on the door's bottom edge, the mount will slip down and may block the doors closure and inhibit the reactive action of the wand and target.

U.S. Pat. No. 4,722,299 issued to Mohr, teaches a linear track-ball enclosure which is free standing. Such systems are easily pushed across the floor during play and exercise. Often such systems become lodged beneath the same furniture that the toy was designed to draw the cat's attention and claws away from.

A door mounted vertical scratching surface is taught by Helmer in U.S. Pat. No. 3,085,551. This scratching surface is suspended off a doorknob and horizontal swing or movement is inhibited by a tension bearing spring anchored to the door knob mount which pulls against a corresponding "U" shaped sleeve which is placed under the door's bottom edge.

None of the solutions provide a durable removable under-the-door anchor which may be used for supporting a variety of toys or exercise devices for the exercise and amusement of a pet.

None of the solutions provide an under-the-door mounted suspended toy or exercise device which does not impair opening or closure of the door.

SUMMARY OF INVENTION

Accordingly, it is an object of the present invention to provide a novel removable under-the-door pet toy anchor mount.

It is yet another object of the invention to provide a durable, removable, under-the-door anchor base for suspending a flexible wand and target object.

It is yet another object of this invention to provide a simple durable anchor for suspending a removably mounted wand and target object from the bottom of an existing door.

It is yet another object of this invention to provide an under-the-door anchor which can be used to affix toys and exercise devices, for small animals, such as track-ball enclosures, scratching surfaces, and targets to an existing dwelling door.

It is yet another object of the invention to provide a durable, removable, under-the-door anchor for a variety of pet toys and exercise devices, which by virtue of its bowed legs allow for horizontal displacement of the anchor, during use, and limits its vertical downward movement and slippage.

The features of the invention believed to be novel are set forth with particularity in the appended claim. The invention itself, however, both as to configuration, and method of operation, and the advantages thereof, may be best understood by reference to the following descriptions taken in conjunction with the accompanying drawings.

BRIEF DESCRIPTION OF THE DRAWINGS

FIG. 1 illustrates a perspective view of the preferred embodiment of the present invention.

FIG. 1A illustrates a side view of the preferred embodiment of the present invention.

FIG. 2 illustrates an assembly view of an alternative embodiment of the under-the-door pet toy.

FIG. 2A illustrates a partial assembly view of an alternate embodiment of the embodiment shown in FIG. 2.

FIG. 3 illustrates a side view of an alternative embodiment of the under-the-door pet toy.

MODES FOR CARRYING OUT THE INVENTION

Figure 4:
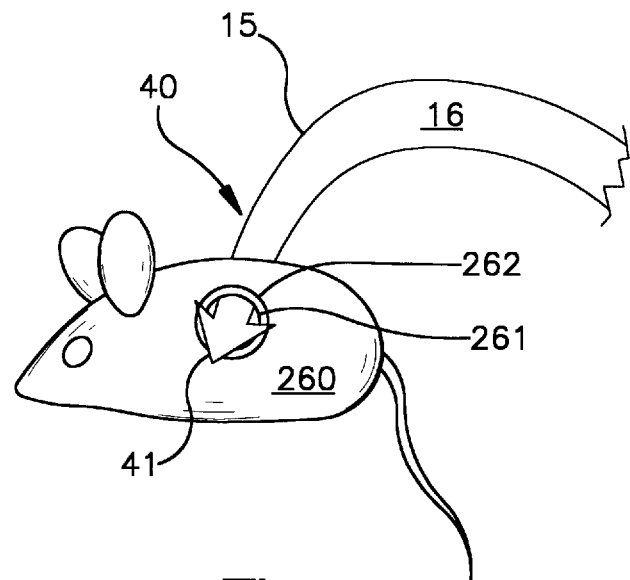
FIG. 4 illustrates an alternate embodiment of the removable target object of the under-the-door pet toy.

Referring now to the drawings, there is illustrated in FIG. 1 a perspective view of the preferred embodiment of the under-the-door, pet toy & exercise device generally designated 10. The under-the-door pet toy 125 is molded to form a resilient plastic "U" comprised of three legs 11,12,13.

The distance between the free ends of the two vertical legs 12 & 13 is narrower than the edge of an existing dwelling door (not shown). To affix the anchor to an existing dwelling door the two vertical legs 12 & 13 are pulled apart beyond the width of the door, the mount is then slid horizontally along the bottom edge of the dwelling door and the vertical legs 12 & 13 are released.

Affixed to the free end of each vertical leg 12 & 13 are rubber-like bumpers 14 constructed of a soft material with a coefficient of friction which will "grip" the door's outer surface, which both inhibit the anchor's 125 movement and protect the door from scratches.

The flexible wand 16 has a first end 15 with a target object 18 affixed thereto and a plurality of ribbons 19 may also be formed as part of, or attached to, the target object 18 to provide additional enticement for the animal to play with the device. A second end 17 is formed as, or affixed to, the outer surface of one of the two vertical legs 13.

Referring now to FIG. 1A, there is illustrated a side view of the preferred embodiment of the under-the-door, pet toy & exercise device 10 of FIG. 1, affixed to the bottom edge of an existing dwelling door 300. The rubber-like bumpers 14 both inhibit downward slippage of the anchor 125 on the door 300 and act as points of rotation so that when the anchor is offset during play, the anchor 125 will skew horizontally along the line of arrow 301.

Referring now to FIG. 2, there is illustrated a perspective view of the an alternate embodiment of the under-the-door pet toy with removable wand and target object generally designated 20.

The anchor 150 is molded to form a resilient plastic "U" comprised of three legs 21,22,23. The rear vertical leg 22 is bowed outward. The distance between the free ends of the two vertical legs 22 & 23 is narrower than the edge of an existing dwelling door. To affix the anchor to an existing dwelling door (not shown) the rear vertical leg 23 is pulled away from the front, vertical leg 22 to a distance beyond the width of a dwelling door, the mount is then slid horizontally along the bottom edge of the dwelling door and the vertical leg 23 is released attaching the device 20 to the door.

Formed or affixed to the outer wall of the front vertical leg 22 is a wand guide 24. The wand guide 24 surrounds a guide channel 25 which is open at the top 26 and is of a predetermined diameter and shape to allow for the insertion of the wand's second end. The wand 16 is removably inserted into the wand guide 24 by inserting the second end 17 into the guide channel through the open top 26 of the vertical guide channel 25.

Referring now to FIG. 2A, there is illustrated a perspective view of the an alternate embodiment of the under-the-door pet toy with removable wand and target object generally designated 20 of FIG. 2.

The anchor 150 forms a flexible resilient plastic "U" comprised of three legs 21,22,23. Formed or affixed to the outer wall of the front vertical leg 22 is a wand guide 31. The wand guide 24 surrounds a guide channel 25 which is open at the top 26 and is of a diameter and shape to allow for the insertion of a wand 16 and which provides two catches 27 at the closed bottom end of the wand guide channel 25. The catches 27 are in the form of an aperture which traverses from the outer wall of the wand guide 24 to the wand guide channel 25.

The wand's second end 17 is extended to form a barbed latch comprised of two flexible "L" shaped legs 28 of a shape, orientation and size correspond to the catches 27.

The wand 16 is removably inserted into the wand guide 24 by pushing the barbed latches 28 together and inserting the wand's second end 17 with barbed latches 28 into the top of the guide channel 25, which push the flexible barbs together and allows passage through the guide channel, when the barbed latches 28 traverse said guide channel to the location of said catches 27, the barbed latches 28 unflex and provide a positive attachment for the wand.

Not shown is the release of the wand 16 from the anchor 150 by applying pressure to the barbed latches 28 so they retract into the guide channel 25 and simultaneously withdrawing the wand 16.

Referring now to FIG. 3, there is illustrated a perspective view of the an alternate embodiment of the under-the-door pet toy generally designated 30.

The anchor 175 forms a flexible resilient plastic "U" comprised of three legs 31,32,33. The rear vertical leg 32 is skewed toward the other vertical leg 33 with the space between the free ends of each vertical leg 33 & 32 being less than the width of a standard residential door 300. When mounted on the door 300 the free end of vertical leg 33 is distorted to accommodate the width of the door 300 placed between the two vertical legs and the reciprocal force exerted against the door 300 by the free end of leg 33 holds the anchor 175 firmly to the door 300.

To increase stability of the anchor and prevent slippage a bumper 14 may be affixed to the free end of either or both vertical legs the 32 & 33.

To further enhance stability of the mount a horizontal cylindrical projection 34 which contains a threaded channel 35 may be formed as part of the rear vertical leg 32 through which a plastic thumb screw 36 with threads corresponding to the threaded channel 35 may be inserted and tightened against the door 300.

The first end 15 of the wand 16 is extended to form a target object mount 38. The second end 17 of the wand 16 is affixed to the front face of the non-skewed vertical leg 33. A channel 37 is formed by the target object mount 38. The target object 250 may be removably attached to the wand 16 by a small threaded plastic bolt 251 which first passes through the channel 37 formed in the target object mount 38 then through a reinforced guide 252 in the body of the target object 250 and is then threaded on to a matching locking compression nut 253. The target object 250 is constructed of a material suitable to withstand batting and clawing by a cat and which may contain catnip, anchovy powder or other natural cat attractant to further entice play and exercise.

Referring now to FIG. 4, there is illustrated a partial view of an alternate embodiment of a target object mount extending from first end of the wand of FIG. 1, generally designated 40.

Formed as an extension to the first end 15 of the flexible wand 16 is a barbed end 41 of a material and thickness which will allow it to allow it to compress for insertion into a channel 261 which passes through the body of a target object 260. A plastic or metal insert or grommet 262 may be used to reinforce the channel 261. The target object 260 is mounted by passing the barbed end 41 through the channel 261. Once the barbed end 41 passes through the channel it will decompress and the undistorted barbs will prevent accidental removal of the target.

Figure 5:
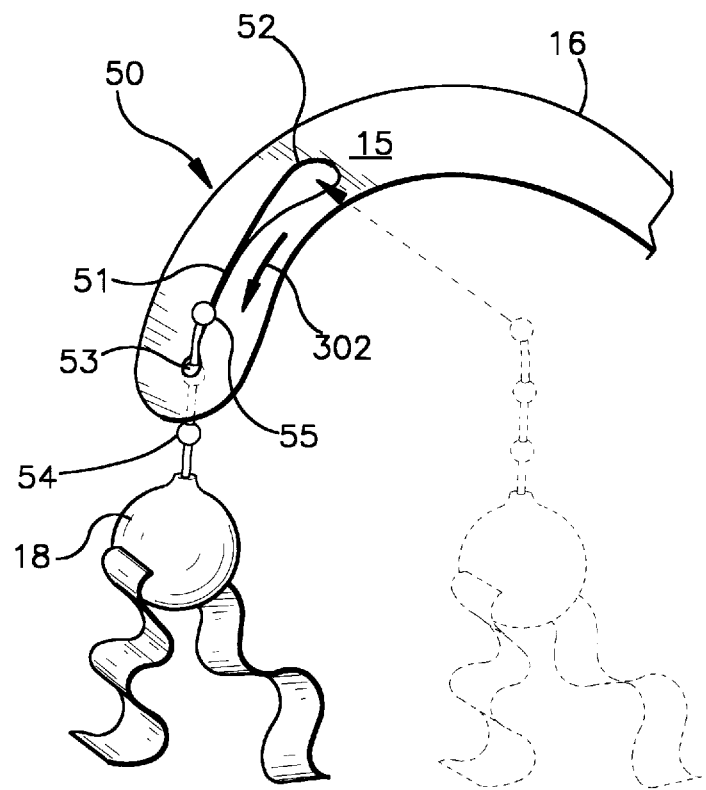
FIG. 5 illustrates an alternate embodiment of the removable target object of the under-the-door pet toy.

Referring now to FIG. 5, there is illustrated a partial view of an alternate embodiment of a target object mount extending from the first end of the wand of FIG. 1, generally designated 50.

Formed as an extension from the first end 15 of the flexible wand 16, is a longitudinal ball chain guide 51 with a top 52 of a diameter adequate to allow unrestricted passage of a ball chain, the mid section of the ball chain guide is of a diameter which allows the movement of the ball chain within the guide yet restricts the passage of the ball chain through the guide 51. The bottom of the ball chain guide 53 is of a diameter which is adequate to allow the larger diameter portion of the ball chain 54 to slip partially through and then rest in place.

The combination target object 18 and ball chain 54 is mounted to the wand by inserting the free end 55 of the ball chain in to the top 52 of the ball chain guide and moving the combination ball chain 54 target object 18 along the line of arrow 302 and allowing it to rest in place at the enlarged bottom of the ball chain guide 53.

Figure 6:
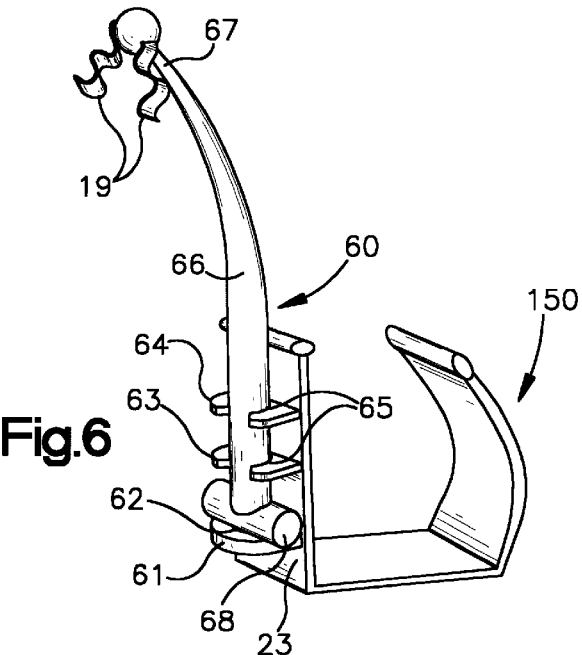
FIG. 6 illustrates a perspective view of an alternate embodiment of the under-the-door pet toy.

Referring now to FIG. 6, there is illustrated a perspective view of the an alternate embodiment of the under-the-door anchor with a vertically mounted flexible wand generally designated 60.

Extending horizontally from face of the front vertical leg 23 of the anchor 150 is a lower guide 61 with a circular guide 62 therein. A plurality of horizontal "C" shaped catches 63 & 64 are formed parallel to the lower guide 61. The guide and catches are formed of a flexible resilient material. Each "C" shaped catch forms a guide 65 of a diameter equal to the diameter of the circular guide 62 in the lower guide 61

Removably mounted to the anchor 150 via the catches 63 & 64 and resting above the lower guide 61 is an elongated flexible wand 66 which tapers from its mid-point to its first end 67 to which a target object 18 with attractant ribbons 19 is molded, as part of, or affixed to. The wand's second end is "T" shaped 68. The diameter of the wand's second end 68 corresponds to the diameter of the guides 65 formed by the "C" shaped catches 63 & 64. Not shown is the distortion of the "C" shaped guides when the wand 66 is snapped into the anchor 150 by pressing the wand 66 against the opening to the guides 65 formed in the "C" shaped catches. The top of the "T" shaped second end 68 on the lower guide 61 to prevent slippage.

Figure 6A:
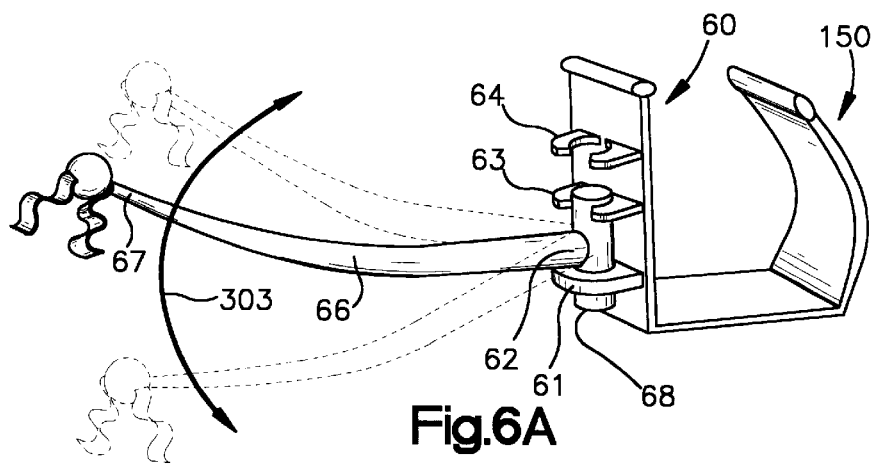
FIG. 6A illustrates a perspective view of the under-the-door anchor of FIG. 6 with a horizontal wand.

Referring now to FIG. 6A, there is illustrated a perspective view of FIG. 6, with the wand 66 removably snapped into the horizontally position also generally designated 60.

The circular guide 62 of the lower guide 61 is of a diameter which corresponds to the diameter of one side of the top of the "T" shaped second end 68 of the wand. The top of the "T" shaped second end 68 is also of a diameter that corresponds to the guides 65 formed by the catches 63 & 64. When mounting the wand 66 in the horizontal configuration, to the anchor 150 one side of the top of the "T" shaped second end 68 is inserted into the circular guide 62, and the wand 66 is raised to horizontal thereby snapping the remainder of the top of the "T" shaped second end 68 into a "C" shaped catch 63. The wand may then freely move along the line of arrow 303.

Figure 7:
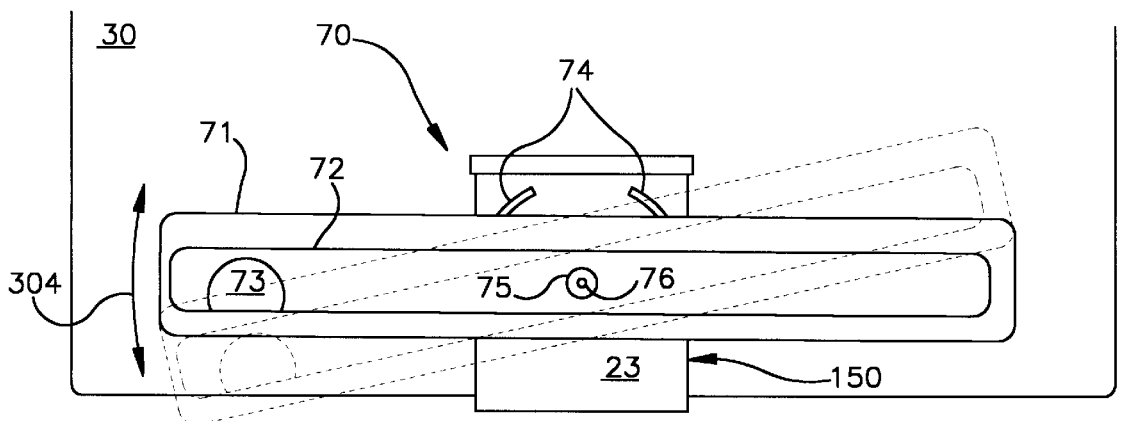
FIG. 7 illustrates a perspective view of an alternate embodiment of the under-the-door pet toy with a track-ball enclosure attached.

Referring now to FIG. 7, there is a front view of an alternate embodiment of the under-the-door anchor providing a rotating linear track-ball enclosure generally designated 70.

The anchor 150 is affixed to the bottom edge of an existing dwelling door as described in FIG. 3. Affixed to the outer surface of the front face of a vertical leg 23 of said anchor is a cylindrical tube 71, covered with a surface suitable for scratching such as carpet or fabric, with sealed ends. Formed within the wall of the cylindrical tube 71 is an elongated aperture of a maximum diameter 72. Within the cylindrical tube is a ball target 73 of a diameter greater than the maximum diameter of the horizontal aperture 72, thereby preventing the removal of the ball target.

The cylindrical tube 71 is affixed to the anchor 150 via a centrally located rivet 75 which passes from the inside of the cylindrical tube through a washer 76 and through the front face of a vertical leg 23 of said anchor thereby allowing rotation of the cylinder around the rivet.

The cylinder is held in a roughly horizontal placement by a set of elastic, or coil spring returns 74 of a fixed length and placement, which are affixed at one end to the anchor and at the other end to the cylindrical tube 71. When a cat (not shown) pushes an end of the cylinder the cylinder will rotate along the line of arrow 304, when released the horizontal cylinder 71 will move back to horizontal by the reciprocal action of the elastic 74.

Since certain changes may be made in the above apparatus without departing from the scope of the invention herein involved, it is intended that all matter contained in the above description, as shown in the accompanying drawing, shall be interpreted in an illustrative, and not a limiting sense.

What is claimed is:

1. A removable under-the-door anchor with pet toy or exercise device attached, comprising:

a) a "U" shaped mounting bracket formed of two vertical legs and one horizontal leg in a preselected width and orientation to fit snugly around the bottom edge of an existing dwelling door and not interfere with the operation of the door wherein the two vertical legs each have one edge affixed to the horizontal leg, and each vertical leg also has a free edge;

b) one or more flexible wands having an elongated central axis, a first end affixed to, or formed as part of, the outer face of one or both of said vertical legs and a second end; and c) a target object molded as part of, or fastened to, said second end of said one or more flexible wands, of a suitable size, weight and material for batting and clawing by a pet, such as fleece, fabric, leather plastic, fur and the like, so that when engaged by the cat to bend said one or more wands in the direction transverse to its elongated axis and under the condition of said target object being released by the cat, said one or more flexible wands will springedly return to an unflexed position.

2. The arrangement defined in claim 1 wherein one or both of said vertical legs are skewed with said free ends separated by a distance less than said affixed ends, which is also less than the width of an existing dwelling door, whereby when mounting said bracket to said door, said legs are pulled apart and then springedly apply pressure on the door when released and mounted.

3. The arrangement defined in claim 2 further comprising one or more horizontal soft bumpers affixed to the free edge of one or both vertical legs of said "U" shaped mounting bracket of a size and material such a rubber, with a coefficient of friction which will increase said bracket's adhesion to said door.

4. The arrangement defined in claim 1, wherein a threaded channel extending vertically from the outer face of one of said vertical legs provides a channel for a thumb screw of a size and length to fit within said threaded channel to be tightened against said door.

5. The arrangement defined in claim 1, wherein a means for removably affixing said one or more wands to said mounting bracket is provided.

6. The arrangement defined in claim 5, wherein said means for removably affixing said one or more wands to said mounting bracket further comprises:

a.) a unaffixed first end of said one or more wands; and b.) a vertical cylindrical guide, open at one end, affixed to the outer face of a vertical leg, of a diameter and size adequate to allow removable insertion of a wand's first end.

7. The arrangement defined in claim 5, wherein said means for removably affixing one or more wands to said mounting bracket, further comprises:

a) a plurality of flexible barbed ends formed at the base of each wand's first end; and b) a plurality of catches in said vertical cylindrical guide of a shape and size adequate to align with said barbed ends so that upon insertion of said barbed ends, said barbed ends latch with said catches and removably affix said one or more wands.

8. The arrangement defined in claim 5 wherein said means for removably affixing said one or more wands to said mounting bracket, further comprises:

(a) a "T" shaped second end on said one or more wands;

(c) a guide extending perpendicularly from the bottom of a face of a vertical leg of said "U" shaped mounting bracket of a size and shape corresponding to said "T" shaped second end; and, (b) a plurality of flexible catches extending perpendicularly from the face of a vertical leg of said "U" shaped mounting bracket, of a size and orientation which allows the removable attachment of said "T" shaped second end in either a vertical or horizontal orientation.

9. The arrangement defined in claim 1, wherein said target object is removable, further comprising:

a) an attaching means on said target object for releasably attaching said target object to each wand's second end; and b) a receiving means formed in each second end whereby said target object may be releasably attached.

10. The arrangement defined in claim 9, wherein:

a) said attaching means for said target object is a ball chain, affixed to said target object, with connecting links and ball members; and b) said receiving means is a guide, formed at the distal end of each wand's second end, with a larger first end which allows insertion of a ball chain, and a tapering guide which is of an adequate width to allow the connecting links of said ball chain to pass through, but prevents the ball chain members from passing through.

11. The arrangement defined in claim 9 wherein:

(a) said receiving means for said target object is a flexible barbed end formed at the first end of each wand; and, (b) said attaching means is a guide of a diameter adequate to allow a insertion of said barbed end, by causing said barbed end to distort and flex until passage through said guide, thereafter said barbed end will return to its unflexed configuration which is larger than said guide.

12. The arrangement defined in claim 9 wherein:

(a) said receiving means, further comprises;
  (1) a circular channel at the first end of each wand of a diameter so that a screw may pass through;
  (2) a screw and corresponding locking nut; and, (b) said attaching means is a reinforced opening in the body of said target object through which said screw, after being inserted into said circular channel may be inserted and said screw's free end may be releasably engaged to said target object by the tightening of said locking nut thereto.

13. A removable under-the-door anchor with pet toy or exercise device attached, comprising:

a) a "U" shaped mounting bracket formed of two vertical legs and one horizontal leg in a preselected width and orientation to fit snugly around the bottom edge of an existing dwelling door and not interfere with the operation of the door wherein the two vertical legs each have one edge affixed to the horizontal leg, and each vertical leg also has a free edge;

b) one or both of said vertical legs are skewed with said free ends separated by a distance less than said affixed ends, which is also less than the width of an existing dwelling door, whereby when mounting said bracket to said door, said leas are pulled apart and then springedly apply pressure on the door when released and mounted;

(c) a hollow horizontal cylinder with sealed ends, affixed to, or formed as part of, the outer face of a vertical leg of said mounting bracket;

(d) one or more channels traversing through the walls of said cylinder of a maximum diameter; and, (e) one or more balls of a diameter larger than said one or more channels' maximum diameter.

14. The arrangement defined in claim 13 further comprising:

(a) a rotating means for affixing said horizontal cylinder to said mounting bracket; and, (b) a spring means for leveling said horizontal cylinder.

15. The arrangement defined in claim 14 wherein said rotating means is a combination of a washer spaced between said horizontal cylinder and said mounting bracket and affixed with a rivet.

\* \* \* \* \*